(12) United States Patent
Matsui et al.

(10) Patent No.: US 6,742,116 B1
(45) Date of Patent: May 25, 2004

(54) SECURITY METHOD, SECURITY SOFTWARE AND SECURITY SYSTEM FOR ELECTRONIC COMMUNICATIONS

(75) Inventors: Kazuki Matsui, Kawasaki (JP); Tatsuro Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/385,961

(22) Filed: Aug. 30, 1999

(30) Foreign Application Priority Data

Sep. 30, 1998  (JP) ........................................... 10-276973

(51) Int. Cl.[7] .............................. H04L 9/00; G06F 15/16
(52) U.S. Cl. ........................ 713/171; 713/163; 713/171; 709/204; 709/205
(58) Field of Search .................................. 713/171, 163, 713/202; 380/277; 709/204, 205

(56) References Cited

FOREIGN PATENT DOCUMENTS

| JP | 1-194542 | 8/1989 |
| JP | 9-321748 | 12/1997 |

*Primary Examiner*—Gilberto Barron
*Assistant Examiner*—A. Nobahar
(74) *Attorney, Agent, or Firm*—Staas & Halsey LLP

(57) ABSTRACT

A security program is installed on a plurality of user terminals that communicate with one another via an electronic conference room. A command interpreter (3) of the security program specifies a chat channel (CHi), a coordinated event (Ti), and an private key (Si), and then directs a common key generator (5) to generate a common key (CSi). The common key generator (5) generates a common key based on at least one of (CHi), (Ti), and (Si), and then stores the common key in a common key memorizer (6). The common key memorizer 6 stores the common key with reference to an index. An encrypter/decrypter (7) encrypts a conversation datum inputted with a newest common key, and transmits to other user terminals the encrypted conversation datum along with an index corresponding to the coordinated event used to generate the common key used to encrypt the conversation datum. The encrypter/decrypter (7) receives conversation datum generated by other user terminals, and decrypts the conversation datum using the common key. The common key to decrypt the conversation datum is retrieved from the common key memorizer (6) using the index received with the conversation datum.

28 Claims, 9 Drawing Sheets

Fig. 2  Functional Structure of Security Device
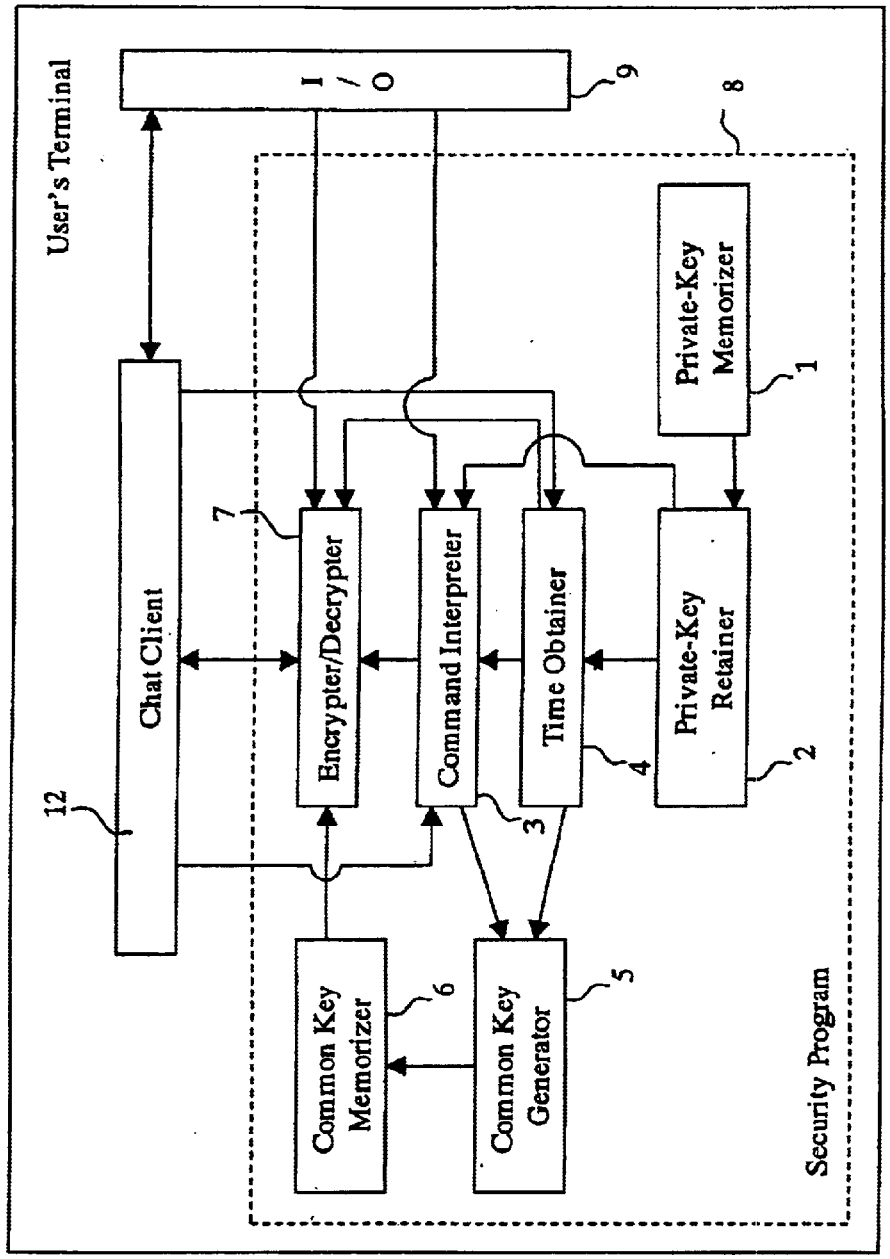

Fig. 3

Private-Key Table

| Index | Private-Key Si |
|-------|---------------|
| 0 | S0 |
| 1 | S1 |
| 2 | S2 |
| ⋮ | ⋮ |
| 23 | S23 |

Fig. 4

Message Datum D1

| Sender's Identifier | Receiver's Identifier | JOIN | 1.1.1.1 |
|---|---|---|---|

Header Portion (Sender's Identifier, Receiver's Identifier) — Data Portion (JOIN, 1.1.1.1)

Fig. 5

Message Datum D2

| Sender's Identifier | Receiver's Identifier | MODE #CH1 +k | newP1 |
|---|---|---|---|

Header Portion — Data Portion

Fig. 6

Message Datum D3

| Sender's Identifier | Receiver's Identifier | MODE #CH1 +C |
|---|---|---|

Header Portion — Data Portion

Fig. 7
Common Key Table at
User's Terminal A
| Index | Common Key |
|-------|------------|
| 0:00  | CS0        |
| 1:00  | CS1        |
| ver 1 | CSver1     |
| 2:00  | CS2        |
| ver 2 | CSver2     |
| ⋮     | ⋮          |
| 23:00 | CS23       |
Common Key Table at
User's Terminal B
| Index | Common Key |
|-------|------------|
| 0:00  | CS0        |
| 1:00  | CS1        |
| 2:00  | CS2        |
| ver 1 | CSver1     |
| ver 2 | CSver2     |
| ⋮     | ⋮          |
| 23:00 | CS23       |
Fig. 8
Message Datum D4
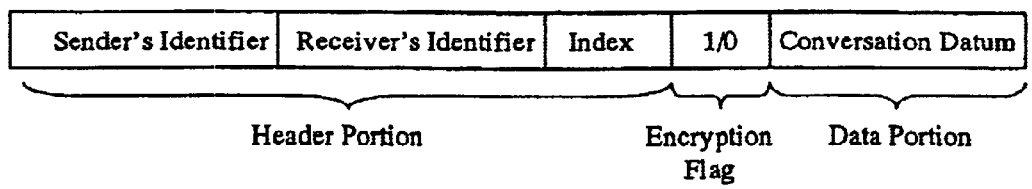
Fig. 9
Screen Displaying an Encryption Button
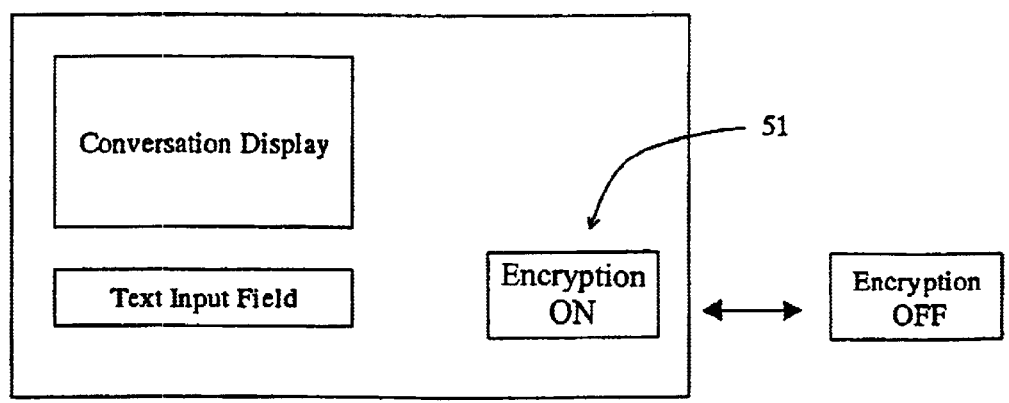

Screen Displaying Encryption-ON Mode

Another Screen Displaying Encryption-ON Mode

SECURITY METHOD, SECURITY SOFTWARE AND SECURITY SYSTEM FOR ELECTRONIC COMMUNICATIONS

BACKGROUND OF THE INVENTION

A. Field of the Invention

The present invention relates to a security method, security software and security system for protecting private communications that are exchanged via a network. More specifically, the present invention relates to a method and system for protecting the contents of private communications in services in which a plurality of users communicate with one another, for instance, via electronic mail (e-mail) where a mailing list is utilized to identify specific parties to communicate with, and via communications transmitted over a network or the Internet such real time chat services.

B. Definition of Terms

When referring to a chat services, chat rooms, and chat channels herein, the inventors are referring to an Internet or network system service which allows a plurality of user terminals to communicate with one another simultaneously in real time sharing a virtual space such as chat room or chat channel. The e-mail communications mentioned herein refer electronic communications between a specific group of users identified in a mailing list where the list identifies each user with an electronic address such as an e-mail address. Also, in the following description, the term electronic conference room refers to both of the above described forms of electronic communication. For example, a chat room administered by a chat server is a virtual electronic conference room where a plurality of users can communicate. Further, a predetermined group of users each may have a mailing list consisting only of the e-mail addresses of the other users in the group. The predetermined group of users may send specific communications to the users each other using the mailing list, for instance, to send one single message to all users identified in the mailing list. Such a mailing list and communications between all parties included in the mailing list also constitute an electronic conference room in the context of the present invention described below.

C. Description of the Related Art

Due to increased usage of personal computers and the ever increasing development of online communication services, there has been an increasing amount of conferencing communications between a plurality of users on networks and on the Internet. Further, there has been an increase in the amount of real time communication over the Internet, in addition to increases non-real time communications such as electronic bulletin board and email communications. Examples of real time communications include chat systems which allow multiple users to chat with one another in real time. In such communication systems, a plurality of users share a single virtual space, which serves as an electronic conference room often referred to as a chat room. Such communication systems generally limit browsing of and participation in the conversation to users who are registered in the electronic conference room.

PROBLEM TO BE SOLVED BY THE INVENTION

Group e-mail communications (using a specific mailing list) and the above described chat systems are examples of electronic conference rooms that are administered by a communication server over a network or the Internet. In principle, conversations that take place in a specific electronic conference room are transmitted only to the specified users who have registered access to the electronic conference room, and it is desirable to maintain privacy to prevent communications from being received by an unwelcome user to the electronic conference room.

In the case of one-to-one communications, such as electronic mail, privacy protection of the communication can be maintained by any of a variety of well known security methods, such as public key encryption. In public key encryption, the sender has a public key used to encrypt a message, and the receiver has a private key used to decrypt the message. If public key encryption is applied to an electronic conference room in which a plurality of users are participating, a sender in a conversation within the electronic conference room must encrypt his or her statements upon transmission into the conversation with different encryption keys (public keys), one encryption key for each recipient to encrypt and/or decrypt the conversation. This is a big burden for the user and for the server that distributes data to each user terminal.

To lessen the burden on the server, some of the users may decide to share a single private key shared amongst all the users, thereby defining a common key. However, if a server that stores the common keys distributes the common keys to the various user terminal or clients, the common keys may have to be encrypted before being distributed, which makes the process even more complicated. If an encryption key is stored as a common key in each of the various users terminals, it is likely that the common key will be deciphered by a third party rendering the encryption virtually useless. Therefore, there is a need for a more reliable method for encrypting electronic communications between a group of user terminals.

SUMMARY OF THE INVENTION

One object of the present invention is to eliminate distribution of encryption keys during communications in an electronic conference room system where a plurality of users share an electronic conference room simultaneously, thereby making it difficult to decipher a private key and allowing an efficient and safe encryption and/or decryption of data transmitted between the users engaged in a conversation in the electronic conference room.

In accordance with one aspect of the present invention, a method ensures privacy and security in a communication system where a plurality of user terminals communicate with one other over a network. The method includes the steps of:

generating a series common key at each of the user terminals, each of the common keys being generated based upon a series of coordinated events that occurs among the user terminals and the network;

storing at each of the user terminals the generated common keys, each common key having a unique index identifying that common key;

encrypting at a sending user terminals a communication using a specific common key;

transmitting over the network from the sending user terminal the encrypted communication along with an index corresponding to the specific common key used to encrypt the communication; and receiving at receiving user terminals the encrypted communication along with the index, identifying the common key used for encrypting the encrypted communication; and decrypting in the receiving user terminals the encrypted communication using the identified common key.

In the present invention, the unique index is based upon a coordinated event identifiable by all of the user terminals.

Preferably, the coordinated events are based upon predetermined time intervals.

Preferably, the coordinated event is based upon actions taken in the communication system.

The predetermined time intervals may be, for instance, one hour time periods. Specifically, each user terminal generates a new common key every hour. Other time periods are possible. Since all of the user terminals have the same security program installed, all of the user terminals generate the same common key at approximately the same time.

Common keys are generated at each of the users terminals at a coordinated times and are stored such that the common keys are indexed based upon the coordinated times. The encrypted communication is sent along with an index corresponding to the coordinated event (in this case a time), the index having a one to one relationship with a specific the common key and is used to encrypt and decrypt the communication.

In accordance with another aspect of the present invention, a communication system includes a security program for ensuring secure and private communications between a plurality of user terminals transmitting communications to each other over a communication network via a communication server. The security program includes a means in each user terminal for storing at least one private key. A means is provided in each user terminal for commanding identification of an identifier corresponding to an electronic conference room administered by the communication server through which the plurality of user terminals communicate with one another. The commanding means is configured to command generation of a plurality of common keys, each of said common keys having a unique index. As well, there is a means in each user terminal for generating the common key based on the identifier and the unique index, and storing the generated common key in the storing means such that the common key is referred to by the unique index. A means is also provided in each user terminal for encrypting communications to be sent from one user terminal to other user terminals via the communication server, the encrypting means using the newest of the common keys. There is also a means in each user terminal for transmitting the encrypted communications to the other user terminals along with the index via the communication server. Further a means is provided in each user terminal for receiving transmitted communications from the other user terminals via the communication server. Lastly, a means is provided in each user terminal for decrypting encrypted communications received from other user terminals using the unique index to identify the common key from said storing means.

Preferably, the commanding means is further configured to detect predetermined changes in the electronic conference room and designate the detected change as a coordinated event, the coordinated event being used by said generating means to a new common key, the new common key having a unique index corresponding to the coordinated event.

Preferably, the commanding means is further configured to designate each coordinated event in accordance with a predetermined passage of time.

Preferably, the storing means stores a plurality of the private keys, the plurality of private keys being indexed in accordance with the predetermined passage of time. The commanding means identifies one of the private key based on the indexing in accordance of the predetermined passage of time.

In accordance with the present invention, the encrypting means encrypts contents of a communication entered at a user terminal with a newest private key. The encryption means transmits a communication message containing the contents of the communication along with indexing information that corresponds to the common key used to encrypt the communication content. Similarly, the decrypting means receives a communication message generated at another user terminal, and decrypts the contents of the communication using the common key identified using the transmitted indexing information. Specifically, the common key to be used to decrypt the contents of the communication is obtained from the storing means by searching for the indexing information obtained from the communication message. Since the all common keys have a one-to-one relationship with an index, and the same set of common keys and corresponding indices are generated in each user terminal separately, messages can be sent between user terminals without transmission of the actual common key.

If the coordinated event is predetermined based upon the changing of the hour (once an hour), a common key is generated once at hour at a predetermined time, for instance, on the hour. Since all user terminals (for instance, personal computers) have an internal clock, each of the user terminals is able to generate the common keys on the hour.

Suppose a communication is encrypted using common key at user terminal A at 11:59 and a common key having an index of 11:00 is used to encrypt the communication, a common key CS11a, which was generated at 11:00 at the user terminal A. The encrypting means sends out the encrypted communication and the index based upon the hour 11:00. If the time in other user terminals, for instance user terminal B, is already 12:01, the encrypted contents of the communication are received along with the index. The time at the user terminal B is after 12:00 and a new common key has already been generated. Even so, the decrypting means of the user terminal B can determine the common key generated at 11:00 used to encrypt the encrypted contents of the communication because the index for the 11:00 common key was transmitted with the encrypted contents of the communication. The decrypting means retrieves the 11:00 common key from the storing means, thereby decrypting the encrypted contents of the communication.

Since common keys are generated at each of the users terminals at coordinated event such as time intervals, the common keys do not have to be distributed. Also, since common key is updated over time, it is harder for a third party to decipher a common key. By storing the common keys with reference to the coordinated event information, such as event indices or time indices, it ensures that an encrypted contents of a communication are always decrypted with a common key that was used to encrypt the encrypted contents of the communication, even when there is a time difference between the sending and receiving users terminals.

The coordinated events may be predetermined passages of time intervals, change in the date, or may be actions that occur with respect to the electronic conference room. Such actions may be, for example, a change of password for participation in the electronic conference room, a change in the users who converse in the electronic conference room, a request to generate a common key, transmission of a message from one of the users terminals, and/or a request to transfer a file.

The private key generation means is a program to generate private keys. Since the storing means does not store the private keys themselves, it is even more difficult for a third party to decipher the private keys, and also the common keys.

Each user terminal includes a display or monitor. The security program is configured such that the encrypting means can display a command button on the screen. The command button allows a user to choose between encryption-on mode and encryption-off mode. In this way, a user can choose whether to encrypt a communication content or not based on the nature of the communication content or to whom the communication content is sent.

The security program is also configured such that the encrypting means includes in transmitted communications a flag indicating whether the communication content is encrypted. The decryption means only decrypts an encrypted communication if a flag indicating encryption is present in the transmitted communication. The encrypted communication content can be decrypted and displayed automatically.

The decrypting means is also configured to display a sign such as an icon of a key at predetermined locations on the display of the user terminal, such as next to a channel name identifying the electronic conference room and/or at the beginning of the conversation text, to show whether a communication sent by another user terminal was encrypted. In this way, a user can visually tell whether the communication content received was encrypted or not.

Access to the electronic conference room requires a password and the command means receives the password from the communication server. Changes in the password may also be used as a basis for generation of a common key (a coordinated event. By utilizing the password as one of the variables from which a common key is generated, it is even more difficult for a third party to decipher the common key.

A security program is configured such that the generating means accepts a maximum number of common keys stored in the storing means. Once the number of the common keys reaches the maximum number of common keys, the oldest key is deleted such that a new common key can be stored. By limiting the number of common keys stored in the storing means, resources of the user terminal can be better utilized.

In accordance with another aspect of the present invention, a computer-readable recording medium includes a security program is stored thereon. The security program is adapted for use with a communication system which administers communication between a plurality of user terminals over a network. The security program is adapted to execute following steps:

A: storing at least one private key;

B: specifying an identifier corresponding to an electronic conference room on the network, coordinated events, and a private key, and directing a common key to be generated at each of the plurality of user terminals in response to a plurality of the coordinated events;

C: generating separately in each of the user terminals a plurality of common keys based on the identifier and a plurality of private keys, and storing the common keys generated such that each common key is identifiable by an index which corresponds to a predetermined series of coordinated events, one index per common key;

D: processing a communication to be transmitted to the electronic conference room, encrypting the content of the communication using the newest of the common keys, and sending a communication message having: 1) contents of the communication in an encrypted form, and 2) one index corresponding to the common key used to encrypt the contents of the communication; and E: receiving a communication message from the electronic conference room, extracting an index from the communication message, identifying the common key using the extracted index, decrypting encrypted contents of a communication using the identified common key.

Preferably, the coordinated events are based upon the passage of predetermined periods of time.

Preferably, the coordinated events are based upon actions taken by at least one of the user terminals.

Preferably, the actions include at least one of: a request for a new common key; and a change in the number of user terminals engaged in a conversation in the electronic conference room.

These and other objects, features, aspects and advantages of the present invention will become more fully apparent from the following detailed description of the present invention when taken in conjunction with the accompanying drawings where like reference numerals denote corresponding parts throughout.

BRIEF DESCRIPTION OF THE DRAWINGS

FIG. 2 is a diagram representing portions of the security system within each of the user terminals depicted in FIG. 1;

FIG. 3 is a table of indices and corresponding private keys used in the security system;

FIG. 4 is an example of a message datum transmitted from the chat server to the user terminals, where the message datum includes information indicating a change in the number of participants at user terminals logged on to a specific chat channel of the server;

FIG. 5 is an example of a message datum similar to the message datum in FIG. 4, but indicating a change in password used to log into the chat channel;

FIG. 6 is an example of a message datum similar to the message datum in FIGS. 4 and 5, indicating a change in common key used to encrypt and decrypt messages sent between the user terminals and the server;

FIG. 7 is a conceptual view of two common key tables, one common key table maintained in user terminal A and the other common key table maintained in user terminal B;

FIG. 8 is an example of a message datum transmitted from and to the user terminals, the massage datum including identification of the sender, identification of the receiver, an index corresponding to a common key in the common key tables depicted in FIG. 7, an encryption flag and conversation datum that may be encrypted using a common key corresponding to the index;

FIG. 9 is an example screen display of one features of the security system displaying an encryption button for selecting Encryption On or Encryption Off;

DETAILED DESCRIPTION OF THE INVENTION

A security system according to the present invention is described below with reference to FIGS. 1–15.

First Embodiment

A first embodiment is described below for use with a chat system as one example of an application of the present invention. It should be understood that other applications of the invention are possible.

In such a chat system, conversations (i.e. real time messages sent back and forth between a plurality of users at user terminals) are encrypted by each message sender and decrypted by each receiving user engaged in the conversation in a specific chat room. Such a chat system administered by a chat server 100, is depicted in FIG. 1.

Figure 1:
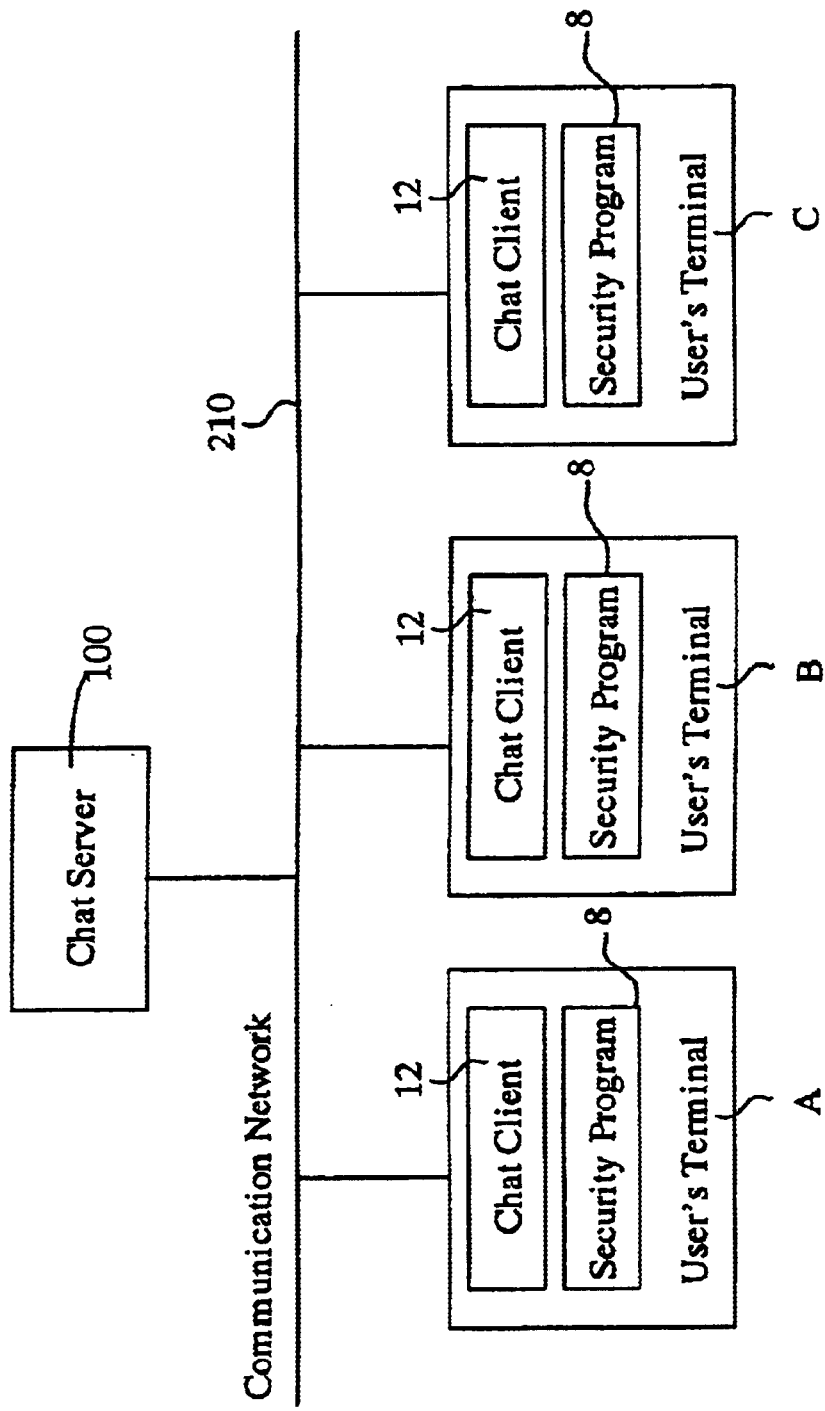
FIG. 1 is a diagram schematically showing a chat server connected via a communication path to a plurality of user terminals, the chat server and user terminals utilizing a security system according to a first embodiment of the present invention.

The chat system, depicted in FIG. 1, includes the chat server 100 connected to a plurality of user terminals such as user terminals A, B and C. Typically, one user uses one user terminal to engage in a conversation in a chat room administered by the chat server 100 which a plurality of other users, each user at his or her own user terminal. The chat server 100 and the users terminals A, B and C are connected via a communication network 210 to the chat server 100. The communication network 210 may be any of a variety of computer networks, such as a Local Area Network (LAN) or the Internet. The communication network 210 allows for real time electronic communication between the user terminals A, B and C and the chat server 100.

The chat server 100 may be configured to administer a plurality of chat rooms or chat channels by directing communications in and out of each individual chat channels to and from the user terminals accessing each individual chat channel. Specifically, communications are segregated such that only messages sent to a specific chat channel are allowed to be transmitted to user terminals logged on to that specific chat channel.

In the description below, each chat channel is an electronic conference room having an identifier such as a name or address, unique to that chat channel. As is described in greater detail below, when the invention is used in a group e-mail application, each user of an e-mail type electronic conference room is identified in a mailing list by, for instance, an e-mail address such as "oo@bar.com", each user having his or her own unique e-mail address.

FIG. 1 shows a structure of a security system according to the first embodiment. As shown in FIG. 1, the security system includes users terminals A, B and C engaged in a conversation with one another on a chat channel administered by the chat server 100, where each of the user terminals A, B and C include a security program 8 installed therein. Only three user terminals are depicted in FIG. 1. However, it should be understood that any number of user terminals may be installed with the security program, so long as each user terminal is authorized to participate in communications in the electronic conference room (chat channel or chat room). It should also be understood that the user terminals A, B and C are, for instance, personal computers or similar terminal devices, that include a display or monitor such as a CRT, a storage means such as a hard drive, a central processing unit (CPU) memory such as RAM and a means for connecting to the network 210 such as LAN card or a modem.

In order to log onto a chat room or communicate in an electronic conference room, some kind of computer communication software application is necessary to effectively communicate with the chat server 100 and other user terminals. The computer software may be any of a variety of software applications. However, for the purpose of describing the present application, the software application used to communicate with the electronic conference room will hereinafter be referred to as a chat client 12 installed in each of the user terminals A, B and C.

Security Program 8

FIG. 2 shows an organizational layout of the various functions of the security program 8 installed in the user terminals A, B and C. The security program 8, as shown in FIG. 2, includes a private key memorizer 1, a private key retainer 2, a command interpreter 3, a time obtainer 4, a common key generator 5, a common key memorizer 6, and an encrypter/decrypter 7. It should be understood that these elements are defined within the program code of the security program 8 which operates within each user terminal.

The private key memorizer 1 is configured to memorize or store a plurality of private keys Si in memory of the user terminal. FIG. 3 shows a conceptual view of an private key table having a plurality of private keys stored by the private key memorizer 1. Preferably, the plurality of private keys Si are recorded in the private key table with reference to indexing information that relates to events such as time, such that the private key can be changed in accordance with events such as elapse of a predetermined time period.

In the example shown in FIG. 3, the private key is indexed by the hour, and the private key is changes at the beginning of every hour. For instance, between 00:00 and 00:59, the private key for the hour is private key S0 whose the index is number 0. Application and usage of the private key table stored in the private key memorizer 1 is provided further below.

Alternatively, the determination with respect to which private key is valid at any point in time may be based upon other predetermined events or coordinated information. For instance, another example of indexing in the private key table in the private key memorizer 1 may include a plurality of private key generating programs with reference to the indices, such that a private key is generated by specifying an index number.

During the operation of the security program 8, as is described in greater detail below, either the command interpreter 3 or the time obtainer 4 provides the private key retainer 2 with an index based upon a time datum Ti (described below). The private key retainer 2 then retrieves a private key Si from the private key memorizer 1, and transmits the private key Si to either the command interpreter 3 or the time obtainer 4 in a manner described further below. For example, if time datum Ti provided corresponds to a time between 10:00 and 10:59, then the private key retainer 2 searches the private key table shown in FIG. 3 using the index "10" to identify a corresponding private key S10. As is described in greater detail below, a common key may be generated, an index relating to a time or an event is generated. The common key index may then be used to identify a specific private key Si.

It should be understood that the private keys Si are unique to each user terminal. In other words, the private keys Si in user terminal A are different from the private keys in the user terminal B. Such private keys Si in user terminal A are also secret from user terminal B.

The command interpreter 3 within each user terminal is configured to detect various triggers that occur in the chat clients 12. The command interpreter 3 then instructs the common key generator 5 to generate a common key by sending to the common key generator 5 the channel name CHi at which the trigger occurred, the time datum Ti, and the private key Si. If a password Pi is required in order to access the channel CHi, the command interpreter 3 also sends the password Pi to the common key generator 5 to make the common key generator 5 generate a common key. More specifically, the command interpreter 3 obtains from the chat client 12 a channel name CHi at which some changes regarding the channel are occurring. Such changes are triggers. For example, if a password Pi is required by the channel CHi, the command interpreter 3 also obtains the password Pi. The command interpreter 3 also obtains time datum Ti of time at which the trigger occurred, thereby giving the time datum Ti to the private key retainer 2 to obtain the private key Si therefrom.

The following descriptions are examples of triggers that are detected in chat client 12 by the command interpreter 3.

(1) When the command interpreter 3 receives from a chat client 12 a message datum that indicates a change in the participants currently accessing a channel or change of the password, the command interpreter 3 directs the common key generator 5 to generate a common key. FIG. 4 shows a conceptual view of a message datum D1 that the command interpreter 3 obtains from chat clients 12. As shown in FIG. 4, the message datum includes a header portion and a data portion, where the header portion includes a sender identifier and a receiver identifier. The sender identifier can be an IP address of a sender or a server. The receiver identifier can be a channel name or an IP address of a specific user. The data portion includes data indicating changes that occur in the channel.

When the participants accessing a specific chat channel change, commands that show changes in participants, such as "JOIN" are "PART" along with the IP address of the user terminal whose status has changed are written on the data portion of a message datum D1. The command interpreter 3 directs the common key generator 5 to generate a new common key.

When the password P1 for a channel whose channel name is #CH1 is changed to "newp1" the command interpreter 3 obtains a message datum D2 as shown in FIG. 5 from the chat client 12. The data portion of the message datum D2 includes a command such as "MODE #CH1+k" that indicates that the password has been changed, and the new password "NewP1". The command interpreter 3 interprets the command and directs the common key generator 5 to generate a new common key.

(2) Once the command interpreter 3 receives from the chat client 12 a message datum D3 that requires a common key to be generated, the command interpreter 3 directs the common key generator 5 to generate a new common key. FIG. 6 shows a conceptual view of the message datum D3. Only an administrator of a channel is authorized to send out the message datum D3. The message datum D3 is sent out from an administrator of a chat channel, and distributed to each chat client 12 from the server 100 after the server 100 confirms that the message datum D3 is sent by an administrator. The data portion of the message datum D3 in this case includes a command such as "MODE #CHi+c" that requests a common key to be generated. The command interpreter 3 directs the common key generator 5 to generate a common key according to the command.

A command from the server 100 to chat clients 12 instructing generation of a new common key is not currently a part of current IRC protocols, and therefore in order for chat clients 12 and the security program 8 to be able to accept such a command, specific changes in the IRC protocols are necessary. Therefore, it should be understood that the use of a command to generate a new common password is new to the IRC protocols. It should also be understood that the use of such a command is only one option or example of a coordinated event of the present invention.

(3) When the command interpreter 3 receives from the chat client 12 a conversation datum that requests an encryption of data, the command interpreter 3 then directs the common key generator 5 to generate a common key, and also sends the conversation datum to the encrypter/decrypter 7. The request for encryption will be explained in greater detail below. If the conversation datum does not include a request for encryption, the command interpreter 3 sends the conversation datum to the encrypter/decrypter 7 such that a communication message is generated, but does not contact the common key generator 5.

The time obtainer 4 is configured to obtain a time datum Ti at a coordinated time or event. The time obtainer 4 then obtains a private key Si based on the time datum Ti. The time obtainer 4 further obtains from the chat client 12 the name of channel CHi that the chat client 12 of the user terminal participates in, and a password Pi for the channel CHi. The time obtainer 4 then sends the channel name CHi, password Pi, time datum Ti, and the private key Si to the common key generator 5 to request that a common key be generated. When the time obtainer 4 obtains a time datum Ti that is based upon a predetermined coordinated time, the time obtainer 4 utilizes a time datum obtaining program routine that utilizes an internal clock of the user terminal. The time datum obtaining program routine is usually provided in an operating system that runs on the user terminal. The format of the time datum Ti should preferably follow GMT (number of seconds counted consecutively since Jan. 1, 1970), which is provided in the time datum obtaining program routine. The time datum can be obtained, for instance everyday at 0:00 am, or at the beginning of every hour. The time obtainer 4 then sends the time datum Ti to the private key retainer 2 to obtain the private key Si that corresponds to the time datum Ti. When time is used to generate a common key, the coordinated time mentioned above may be, for instance, predetermined time intervals such as one hour intervals, two hour intervals, etc.

The common key generator 5 generates a common key CSi based on a command from the command interpreter 3 or the time obtainer 4, using the channel name CHi, the private key Si, the time datum Ti, and the password Pi, if required. The common key is generated using a one-way function F. In other words, the common key CSi can be obtained with a function CSi=F(private key Si, channel name CHi, time datum Ti). More specifically, the one-way function is a MD5 (Message Digest Algorithm cf: RFC1321). A 128-bit hash value obtained from the MD5 is the common key CSi.

The common key generator 5 stores the common key CSi in the common key memorizer 6 along with reference to the coordinated time when the common key CSi was generated. FIG. 7 shows a conceptual view of common key tables stored in the common key memorizers 6 of the user terminals A and B. In FIG. 7, the heading "Index" indicates a time index and/or event index when a common key was generated. In the present embodiment, a common key is generated at hour intervals as a result of a command from the time obtainer 4. A common key is also generated upon a command from the command interpreter 3 when the command interpreter 3 detects a trigger or coordinated event.

On the right hand side column of the tables in FIG. 7, there are two types of common keys. One type of common keys was generated based upon coordinated time intervals, specifically, hourly intervals as commanded by the time obtainer 4. These common keys in the present embodiment have time indices 0:00, 1:00, 2:00, etc. A second type of common keys are listed in the tables in FIG. 7 with the indices "ver1" and "ver2" and were generated by a command from the command interpreter 3 in response to a coordinated event or trigger. The common keys in the table in User Terminal A are the same as the common keys in the table in User Terminal B. The order of indices and common keys are different in the tables of user terminals A and B because, for instance, the internal clocks of the two terminals may not have the same time. For instance, the clock in user terminal B may be several minutes ahead of the clock in user terminal A. Since the common keys at time indices were generated based upon a change in time, both users terminals A and B generate the corresponding common keys, but perhaps not at exactly the same time. However, events or triggers that are sensed by the command interpreter 3 which cause creation of a new common key are sensed while the user terminals A and B are on-line and in communication with the chat server 100. Therefore, regardless of the time index within each respective user terminal, both user terminals A and B detect the event or trigger simultaneously. Therefore, both user terminals A and B record the creation of the common keys at indices "ver1" and "ver2" based upon a coordinated event, not their respective internal time clocks. However, by storing common keys with reference to either coordinated time or coordinated event indices in each user terminal, each user terminal can identify the appropriate common key used to encrypted a communication.

The common key generator 5 allows a user to determine a maximum number of common keys that can be stored in the common key table. The common keys are stored in the common key table as the common keys are generated, until the number of the common keys reaches the maximum number set by the user. Once the number of the common keys in the common key table reaches the maximum number, the common key table deletes the oldest common key, such that new common keys can always be retained.

The encrypter/decrypter 7 is configured to obtain conversation datum from the command interpreter 3, encrypts the conversation datum using a newest common key CSi stored in the common key table, and generates a message datum D4, adding address information. It should be understood that the conversation datum, may be any of a variety of data, for instance, the conversation datum could be text inputted by a user at the user terminal connected to the chat server 100, or may be for instance, graphical data. The conversation datum is transmitted to and from user terminals A, B and C, and the chat server 100 along with other datum in a message datum D4 as depicted FIG. 8. FIG. 8 shows a conceptual view of one such message datum D4.

The message datum D4 includes a header portion, a data portion, and also an encryption flag. The encryption flag is a one-bit data field that indicates whether the conversation datum is encrypted, 0 being encryption-off, and 1 being encryption-on. The data portion contains encrypted conversation datum when the encryption flag is 1, and non-encrypted conversation datum when the encryption flag is 0. The header portion of the message datum D4 includes a sender identifier, a receiver identifier, and also index information. The index information includes one of the indices in the common key table that corresponds to the common key used for encrypting the conversation datum, thereby indicating the time or event corresponding to the common key generated. By including the index of the common key that is used for encrypting data in the message datum D4, the encrypted data can be decrypted with a common key corresponding to the same index by a receiving user terminal. The message datum D4 is sent to the chat client 12, then further to other users terminals via the chat server 100.

The encrypter/decrypter 7 also accepts a users input in which the user may request whether or not the conversation datum is to be encrypted. FIG. 9 shows an example of a screen displaying an encryption button 51 that allows a user to switch between "Encryption On" and "Encryption Off". To encrypt conversation datum, the user clicks the mouse on the encryption button 51, whereby the color of the encryption button 51 changes to indicate the "Encryption On" mode. When the encrypter/decrypter 7 receives conversation datum to be transmitted while in the "Encryption On" mode, the encryption flag of the communication message is set as 1, and the conversation datum is encrypted and written in the data portion of the message datum D4. When the user clicks the mouse on the encryption button 51 again, the color of the encryption button 51 changes back to the original color to indicate the "Encryption Off" mode.

Further, if a message datum D4 is received by a user terminal from the chat server 100, the encrypter/decrypter 7 receives from the chat client 12 the received message datum D4 generated by another user terminal, and uses the index information in the header portion of the message datum D4 to identify the corresponding common key, then decrypts the conversation datum in the message datum D4. Specifically, upon receiving the message datum D4, the encrypter/decrypter 7 looks at the encryption flag. If the encryption flag is 1, then the encrypter/decrypter 7 extracts the index information from the header portion. The encrypter/decrypter 7 then retrieves the common key CSi from the common key memorizer 6 based on the index information extracted. The encrypter/decrypter 7 then extracts the conversation datum from the message datum D4 and decrypts the conversation datum using the common key csi.

For instance, in a case where the users terminals A and B have common keys as shown in FIG. 7, if the user terminal A sends a conversation datum in a message datum D4 that has been encrypted with a common key that corresponds to index "ver1", the user terminal B which receives the message datum D4, identifies the index information in the message datum D4, retrieves a common key corresponding to the index information "ver1" from the common key table of the user terminal B, and then decrypts the conversation datum with the identified common key. The decrypted conversation datum is then sent to the chat client 12 and displayed on the screen of the user terminal B.

It should be understood that the program or routine used for the actual conducting an encryption/decryption may be any of a variety of known or new encryption methods and algorithms. The present invention in not limited to any specific encryption algorithm. Rather, the present invention is directed to a method for identifying a common key used by the encryption algorithm. Specifically, one aspect of the present invention is the use of a common key CSi for decryption obtained by referring to the index information of the message datum D4 and retrieving from the common key table a common key CSi that corresponds to the index information.

Figure 10:
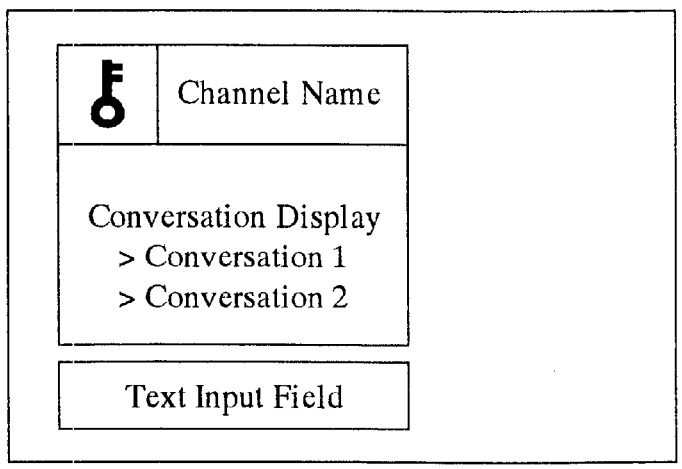
FIG. 10 is an example of a screen display of another features of the security system showing an icon which indicates that Encryption On was selected in the screen depicted in FIG. 9.
Figure 11:
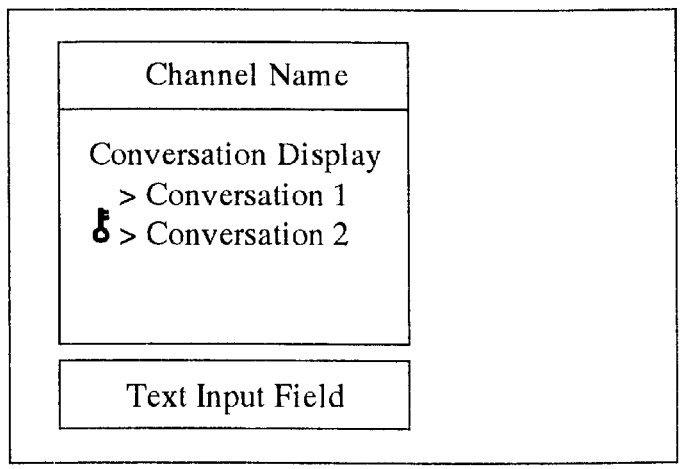
FIG. 11 is another example of a screen display of another features of the security system showing an icon which indicates that Encryption On was selected in the screen depicted in FIG. 9.

As shown in FIG. 10, each user terminal is able to indicating on a view screen or monitor whether or not the displayed conversation datum was transmitted in an encrypted format. FIG. 10 shows an example of a screen of a user terminal. In FIG. 10, an icon in the shape of a key (in the upper left hand corner of the screen image) indicates that the "Encryption On" mode is enabled. Therefore, all text or conversation in and out of the user terminal is encrypted or decrypted by the encrypter/decrypter 7. The key icon appears next to the channel name if the conversation datum received was encrypted. FIG. 11 shows another example of a screen displayed on the user terminals where the "Encryption On" mode is enabled. As shown in FIG. 11, an icon in the shape of a key is located next to the conversation datum "conversation 2" indicating that the conversation datum "conversation 2" was encrypted but "conversation 1" was not encrypted.

Process Flow (1) Common Key Generation Process

Figure 12:
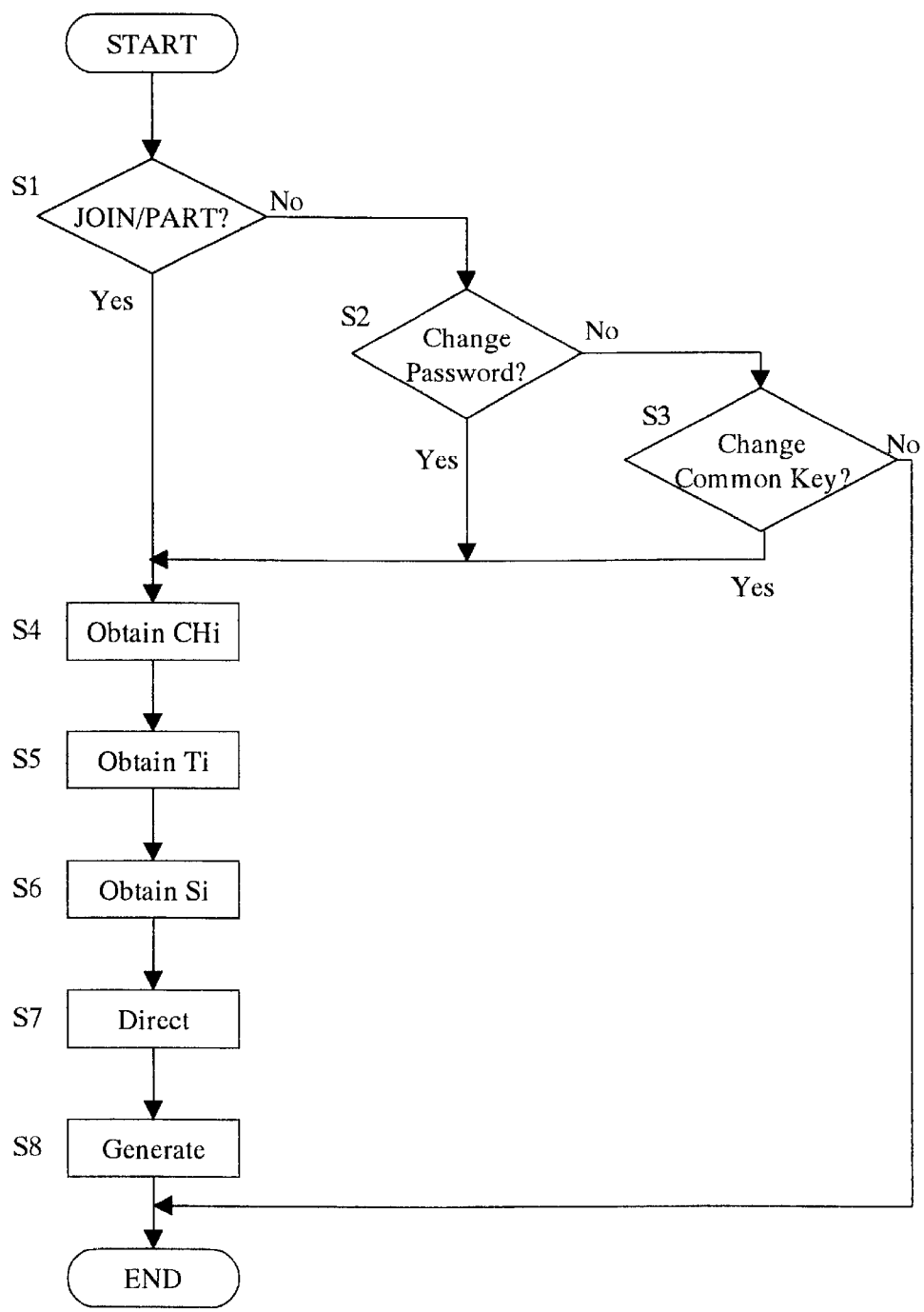
FIG. 12 is a flow chart showing a common key generation process designed to generate a common key in response to a coordinated event.
Figure 13:
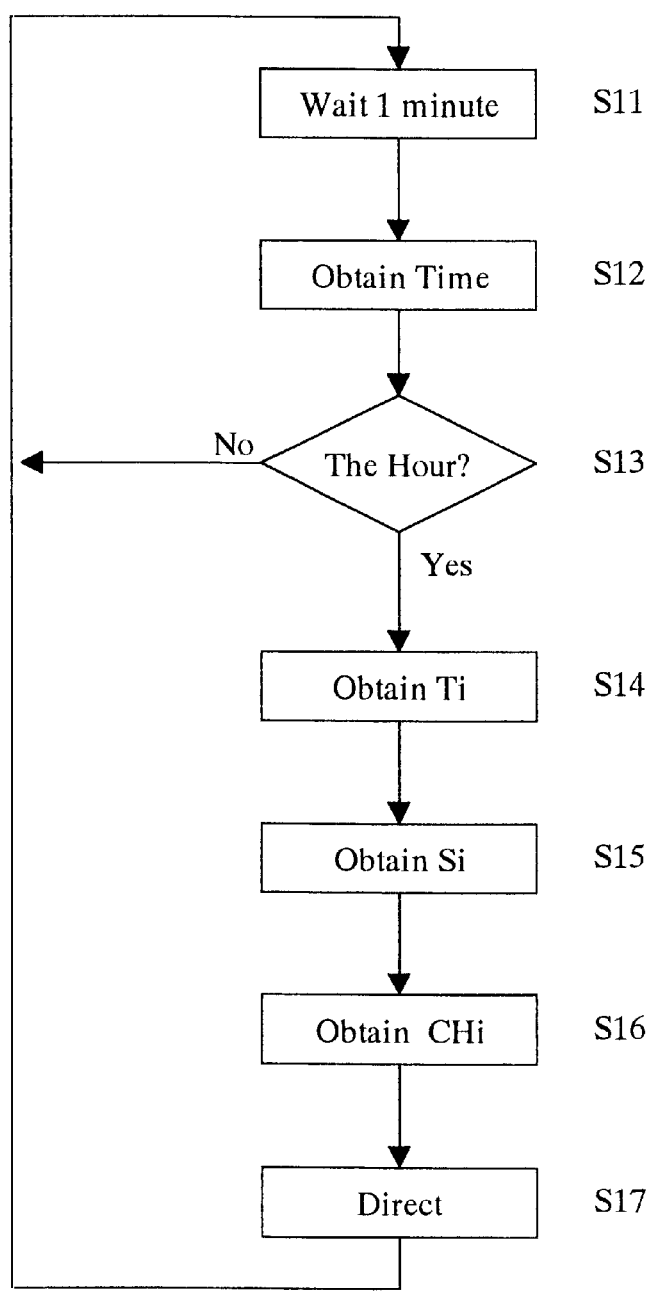
FIG. 13 is a flow chart to show the common key generation process designed to generate a common key in response to a coordinated time.

The process to generate a common key using the above-described security program is described below. FIG. 12 shows a flow chart showing the common key generation process based on a command from the command interpreter 3. FIG. 13 shows a flow chart showing the common key generation process based on a command from the time obtainer 4. The processes shown in FIGS. 12 and 13 are executed independently from each other.

FIG. 12 shows a case where, for the sake of simplification, the coordinated event used to generate a new common key, is a trigger that may be, for instance, a change in participants on the chat channel, change of password, or change of common keys. However, it should be understood that the trigger used as a coordinated event may be any of a variety of other events and FIG. 12 only show three such examples. The process shown in FIG. 12 is initiated by any one of the above triggers.

In step S1, the command interpreter 3 determines whether the participants in the chat channel have changed. More specifically, the command interpreter 3 determines that there has been a change in the number of participants currently engaged in conversation on a specific chat channel when the command interpreter 3 receives from the chat client 12 a message datum D1 having either "JOIN" command indicating that a participant has joined the chat channel, or "PART" command indicating that a participant has left the chat channel. If the command interpreter 3 determines that there has been a change in the participants, step S4 ensues. If the command interpreter 3 determines that there has not been a change in the participants, the step S2 ensues.

In step S2, the command interpreter determines whether the password of the chat channel that the chat client 12 participates in has been changed. More specifically, the command interpreter 3 determines that the password has been changed when the command interpreter 3 receives from the chat client 12 a message datum D2 having a new password, and a command "MODE #Channel Name +k" which is a command to change password, in the data portion. If the command interpreter 3 determines that the password has been changed, then step S4 ensues. If the command interpreter 3 determines that the password has not been changed, then step S3 ensues.

In step S3, the command interpreter determines whether there has been a request to change the common key. More specifically, the command interpreter 3 determines that there has been a request to change the common key when the command interpreter 3 receives from the chat client 12 a message datum D3 having a command to change the common key in the data portion. If the command interpreter 3 determines that a new common key needs to be generated, then step S4 ensues. If the command interpreter 3 determines that a new common key does not need to be generated, then the processes ends.

When the command interpreter 3 determines that any of the above-described triggers has occurred, step S4 ensues. In step S4, the command interpreter 3 obtains from the chat client 12 the channel name of the channel where the trigger occurred, and password Pi to the channel. This example hereinafter assumes that the channel name is Chi.

In step S5, the command interpreter 3 obtains from the time obtainer 4 time at which the trigger (coordinated event) occurred, and stores the information as time datum Ti.

In step S6, the command interpreter 3 sends the time datum Ti to the private key retainer 2. The private key retainer 2 then obtains the index number from the time datum Ti, searches the private key table for an private key Si that corresponds to the index number, and sends the private key Si to the command interpreter 3.

In step S7, the command interpreter 3 sends the channel name #CHi, the password Pi, the time datum Ti, and the private key Si to the common key generator 5, directing the common key generator to generate a new common key.

In step S8, the common key generator generates a common key CSi, using a one-way function, and stores the common key CSi in the common key table with reference to the index.

Common key generation processes designed to run upon a command from the time obtainer 4 is explained below with reference to FIG. 13. For simplicity, an example of the present invention is provided where a common key is generated at the beginning of every hour. However, it should be understood that any predetermined time interval could be used as a coordinated event or coordinated time.

In steps S11 through S12, the time obtainer 4 obtains time information, for instance, every minute, utilizing a time obtaining program routine.

In step S13, the command interpreter determines whether the time information indicates the beginning of the hour. If the time information indicates the beginning of the hour, then step S14 ensues. Otherwise, the steps S11 through S12 ensue.

In step S14, the time obtainer 4 sets the latest time information obtained as time datum Ti.

In step S15, the time datum Ti is sent to the private key retainer 2, through which an private key Si is obtained.

In step S16, the time obtainer 4 obtains from the chat client 12 the name of the channel in which the chat client 12 is participating, and the password Pi to the channel.

In step S17, the time datum Ti, the channel name CHi, the password Pi, and the private key Si are sent to the common key generator 5, directing the common key generator to generate a new common key. The command interpreter 3 then returns to the step S11 to repeat the above-described processes.

(2) Encryption/Decryption Processes

Figure 14:
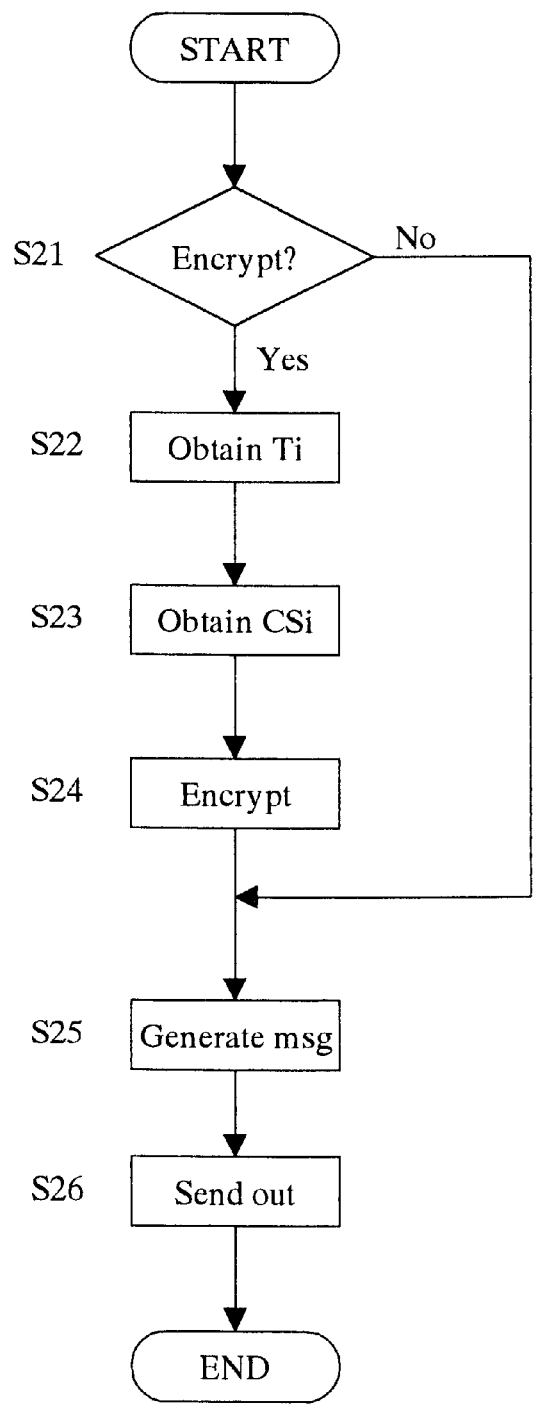
FIG. 14 is a flow chart showing an encryption process.
Figure 15:
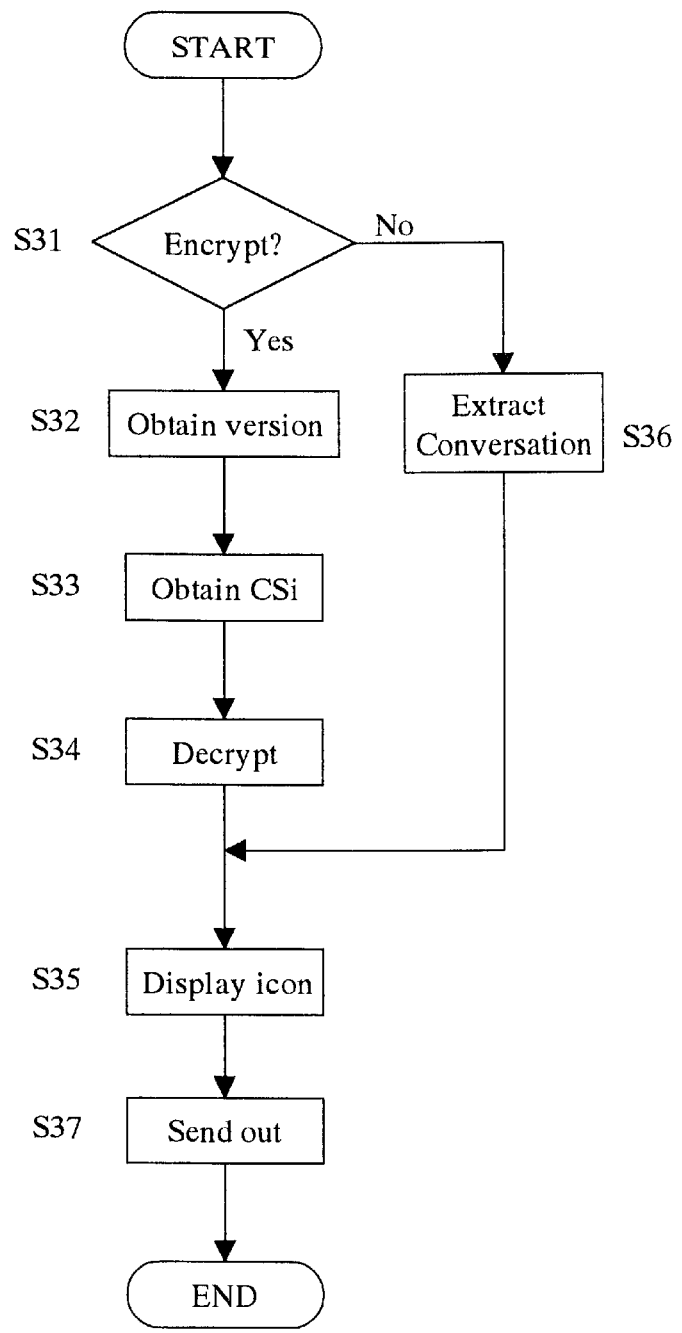
FIG. 15 is a flow chart showing a decryption process.

Process of encrypting/decrypting conversations in a chat system using the security program is described below. FIG. 14 is a flow chart of the encryption process of the security program. FIG. 15 is a flow chart of decryption process of the security program. Encryption process shown in FIG. 14 is explained first. The process is initialized when the encrypter/decrypter 7 obtains a conversation datum from the chat client 12.

In step S21, the encrypter/decrypter 7 determines whether the user has set the encryption button 51 in the "Encryption On" mode. If the encryption button 51 is in the "Encryption On" mode, then step S22 follows. If the encryption button 51 is in the "Encryption off" mode, it means that the conversation datum does not have to be encrypted. Therefore step S25 ensues, as is explained in greater detail below.

In step S22, the encrypter/decrypter 7 obtains from the time obtainer 4 time information pertaining to the time at which the conversation was entered.

In step S23, the encrypter/decrypter 7 obtains from the common key table the newest common key CSi. The encrypter/decrypter 7 obtains from the common key table also the index that corresponds to the common key CSi, in other words, information that indicates the time or event corresponding to generated common key.

In step S24, the encrypter/decrypter 7 encrypts the conversation datum using the common key CSi.

In step S25, the encrypter/decrypter 7 generates a message datum D4, which includes a header portion, an encryption flag 1, and a data portion. If the encryption mode was found to be "On" in step S21, the encrypter/decrypter 7 sets the encryption flag as "1" and generates a message datum D4 that includes an encrypted conversation datum in the data portion. If the encryption mode turned out to be "Off" in step S21, the encrypter/decrypter 7 sets the encryption flag as 0 and generates a message datum D4 that includes a non-encrypted conversation datum in the data portion. In step S25, the header portion of the message datum D4 is also created with an index. The index can be either the time Ti or, an index corresponding to an event, such as "ver1".

In step S26, the message datum D4 generated in step S25 is sent to the chat client 12. The message datum D4 is then distributed to other users via the server and is decrypted as needed.

Now, decryption process shown in FIG. 15 is explained. The process is initiated when the encrypter/decrypter 7 obtains from the chat client 12 a message datum D4 generated by another user terminal.

In step S31, the encrypter/decrypter 7 determines whether the encryption flag in the received message datum is "0" or "1". If the encryption flag is "1", step S32 ensues. If the encryption flag is "0", it means that the conversation datum does not have to be decrypted. Therefore, step S36 ensues, as is explained in detail below.

In step S32, the encrypter/decrypter 7 extracts from the header portion of the message datum the index information, in other words information that indicates the coordinated time or coordinated event corresponding to the generated common key used for encryption.

In step S33, the encrypter/decrypter 7 retrieves from the common key table a common key CSi that corresponds to the index information, using the index information as an index.

In step S34, the encrypter/decrypter 7 extracts the encrypted conversation datum from the message datum, and decrypts the encrypted conversation datum using the common key CSi obtained in step S33.

In step S35, the encrypter/decrypter 7 displays an icon, such as those in either of FIG. 10 or 11, indicating that the encryption-on mode was used to transmit the displayed conversation.

Step S36 is a case where the encrypter/decrypter 7 determined that the encryption flag is "0" in step S31. The conversation datum in the data portion of the message datum is extracted as it is.

In step S37, the encrypter/decrypter 7 sends the decrypted or extracted conversation datum to the chat client 12 to be displayed in the screen. The process then ends.

Second Embodiment

When a one-to-one conversation takes place in a chat system, an identifier can be assigned to the electronic conference room, using the identifiers of the users who participate in the conversation. For instance, if user A's identifier is the text "fool" and user B's identifier is text "bar" the identifier for the electronic conference room where the user A starts talking to the user B can be set as text "foobar".

When the user terminal A sends a file to the user terminal B, a common key CS can be generated in the following manner. The user terminal A sends a message datum D5 to the user terminal B. The message datum D5 includes a predetermined datum in the data portion. The data portion of the message datum D5 includes at least a command to transfer the file, the name of the file, and the size of the file. Both of the users terminals consider the header portion and the data portion of the message datum D5 as a text, as an identifier for an electronic conference room. In this way, the users terminals can generate an identical common key CS, with which the two users can conduct encrypted communication. Generally, all of the operations of common key generation, encryption and decryption are the same as in the first embodiment, except that only two user terminals communicate with one another in the second embodiment.

Third Embodiment

The present invention also applies to a mailing list transmission whereby a user creates a communication and uses the security program 8 to encrypt the communication. The security program also creates the message datum D4 which includes index information identifying a common key. The communication is then transmitted over the Internet or network to each user terminal identified in the mailing list. Each user terminal having the security program 8 is able to receive the communication, and based upon the message datum D4, the security program 8 in each receiving user terminal can decrypt the communication by first identifying the common key using the index, then decrypting the message.

It should further be understood that security program 8 of the present invention may be a software program sold on a disk such as a CDROM, and thereafter installed on user terminals. Alternatively the security program 8 may be an actual security device with the necessary operations built into circuitry in the security device. The security device may then be installed in each of the user terminals.

EFFECT OF THE INVENTION

According to the present invention, users terminals can generate common keys simultaneously, and the common keys change as a result of the passage of time or the occurrence of predetermined events. Therefore, there is no need to distribute the common keys to the users. As a result, the risk of the common keys being deciphered or falling into unintended hands is reduced. By sending information pertaining to coordinated events as the common key is generated along with the communication content, a receiving terminal can decrypt encrypted the contents of a communication (conversation datum) with a common key that was used to encrypt the communication content at a sending terminal, even when the users terminals have a time difference. Further, the common key itself is not transmitted between user terminals.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A method of ensuring privacy and security in a communication system as an electronic conference room where a plurality of user terminals communicate with one other over a network, said method comprising:

detecting predetermined changes in the electronic conference room;

designating the detected changes as coordinated events;

generating a series common key at each of the user terminals, each of the common keys being generated based upon the coordinated events;

storing at each of the user terminals the generated common keys, each common key having a unique index identifying that common key;

encrypting at sending user terminals a communication using one of the stored common keys;

transmitting over the network from the sending user terminal the encrypted communication along with one of the indexes corresponding to the one specific common key used to encrypt the communication; and receiving at receiving user terminals the encrypted communication along with an index that identifies the common key used for encrypting the encrypted communication; and decrypting in the receiving user terminals the encrypted communication using the common key identified according to the index.

2. The method as set forth in claim 1, wherein each coordinated event is identifiable by all of the user terminals and the unique index identifying the common key is based upon the coordinated event based on which the common key is generated.

3. The method as set forth in claim 2, wherein the coordinated event is based upon predetermined time intervals.

4. The method as set forth in claim 2, wherein the coordinated event is based upon actions taken in the electronic conference room.

5. A communication system ensuring secure and private communications between a plurality of user terminals transmitting communications to each other over a communication network via a communication server, the system comprising:

a storage in each user terminal storing security information;

a computer processor in each user terminal and programmed to control the user terminal according to a process comprising:

commanding identification of an identifier corresponding to an electronic conference room administered by the communication server through which the plurality of user terminals communicate with one another, generating a plurality of common keys based upon the identifier, each generated common key having a unique index identifying the common key, detecting predetermined changes in the electronic conference room, designating the detected changes as coordinated events, generating a plurality of new common keys based upon the coordinate events, each new common key having as the unique index a coordinate event that triggered generation of the new common key, storing the generated common keys in the storage such that each common key is identifiable by each unique index, encrypting communications to be sent from one user terminal to other user terminals via the communication server, the encrypting using a newest of the common keys stored in the storage, transmitting, via the communication server, the encrypted communications to the other user terminals along with one of the indexes corresponding to the encrypting communication key, receiving transmitted encrypted communications from the other user terminals via the communication server, and decrypting the encrypted transmitted communications from other user terminals by using a received unique index to identify an encrypting common key from the storage.

6. The communication system as set forth in claim 5, wherein said commanding further comprises designating each coordinated event according to a predetermined passage of time.

7. The communication system as set forth in claim 6, wherein:

the storage stores a plurality of private keys, the plurality of private keys indexed according to each coordinated event of the predetermined passage of time, and the commanding identifies one of the private keys based on the indexing according to the coordinated event of the predetermined passage of time and generates the plurality of the new common keys based upon the coordinated events and the private keys identified based upon the coordinated events.

8. The communication system as set forth in claim 7, further comprising a private key generator generating the plurality of the private keys and the corresponding indices.

9. The communication system as set forth in claim 5, wherein said encrypting is selectively controlled in an encryption on mode where communications are encrypted prior to the transmitting, and an encryption off mode where communications are not encrypted prior to the transmitting.

10. The communication system as set forth in claim 9, wherein said transmitting transmits communications along with a flag designating one of said encryption on mode and said encryption off mode.

11. The system of claim 10, wherein the programmed computer processor further display a sign that visually indicates whether a received communication is encrypted.

12. The system of claim 5, wherein:

access to the electronic conference room of the communication server is restricted by usage of a password, and the communication server is configured to selectively create a new password and transmit the new password to each of the user terminals; and said commanding detects the new password and designates creation of the new password as a coordinated event, and in response to the detection of the new password, generates another new common key having a unique index corresponding to the coordinated event.

13. The system of claim 5, wherein a date change a coordinated event.

14. The system of claim 5, wherein a change in a number of user terminals engaged in communication with the electronic conference room is a coordinated event.

15. The system of claim 5, wherein each of the user terminals is configured to process a request from a user at one of the user terminals for generation of a new common key, and the commanding designates the request as a coordinated event.

16. A communication system ensuring secure and private communications between a plurality of user terminals transmitting communications to each other over a communication network via a communication server, the system comprising:

storing means in each user terminal for, storing security information;

commanding means in each user terminal for controlling the user terminal according to a process comprising:
commanding identification of an identifier corresponding to an electronic conference room administered by the communication server through which the plurality of user terminals communicate with one another,
generating the plurality of common keys based on the identifier, each generated common key having a unique index identifying the common key,
storing the generated common keys in the storing means such that each common key is identifiable by the unique index,
defining a limit on a maximum number of common keys storable in said storing means, and
once the maximum number of the common keys has been stored in said storing means, deleting an oldest of the common keys to make room for a new common key;

encrypting means in each user terminal for encrypting communications to be sent from one user terminal to other user terminals via the communication server, the encrypting means using a newest of the common keys stored in the storing means, transmitting means in each user terminal for transmitting, via the communication server, the encrypted communications to the other user terminals along with one of the indexes corresponding to the encrypting communication key;

receiving means in each user terminal for receiving transmitted encrypted communications from the other user terminals via the communication server; and decryptng means in each user terminal for decrypting the encrypted transmitted communications from other user terminals using a received unique index to identify an encrypting common key from said storing means.

17. The system of claim 16, wherein a date change is a coordinating event that triggers the generating of one of said common keys and a corresponding unique index.

18. A computer-readable recording medium on which a security program is stored, the security program being adapted for use with a communication system which includes communication as an electronic conference room between a plurality of user terminals over a network, the security program being adapted to control a user terminal according to a process comprising:

storing at least one private key;

detecting predetermined changes in the electronic conference room;

designating the detected changes in the electronic conference room as coordinated events;

specifying an identifier corresponding to an electronic conference room on the network, a coordinated event and a private key;

generating separately in each user terminal at least one common key based on the specified electronic conference room identifier, the coordinated event, and the private key;

storing the generated common keys such that each common key is identifiable by an index that corresponds to the coordinated event based upon which the common key was generated;

processing a communication to be transmitted to the electronic conference room by encrypting content of the communication using a newest of the at least one stored generated common key;

sending the encrypted communication along with one of the indexes corresponding to the newest common key used to encrypt the contents of the communication;

receiving a communication message from the electronic conference room;

extracting an index from the received communication message;

identifying one of the stored generated common keys using the extracted index; and decrypting the encrypted contents of the received communication message using the identified common key.

19. The computer-readable recording medium of claim 18, wherein the coordinated events are based upon passage of predetermined periods of time.

20. The computer-readable recording medium claim 18, wherein the coordinated events are based upon actions taken by at least one of the user terminals.

21. The computer-readable recording medium of claim 20, wherein the actions comprise at least one of a request for a new common key and a change in a number of user terminals engaged in a conversation in the electronic conference room.

22. A communication system comprising:

a plurality of user terminals that communicate with one another over a network; and a server adapted to distribute communications between said plurality of user terminals;

each user terminal comprising;

commanding means for controlling the user terminal according to a process comprising:
commanding identification of an identifier corresponding to an electronic conference room administered by the communication server through which the plurality of user terminals communicate with one another,
generating a plurality of common keys based on the identifier, each generated common key having a unique index identifying each common key,
detecting predetermined changes in the electronic conference room,
designating the detected changes as coordinated events,
generating a plurality of new common keys based upon the coordinated events, each new common key having as the unique index a coordinated event that triggered generation of the new common key, and
storing the generated common key such that the common key is identifiable by each unique index;

encrypting means for encrypting communications to be sent from one user terminal to other user terminals via the communication server, the encrypting means using a newest of the common keys stored in the storing means;

transmitting means for transmitting, via the communication server, the encrypted communications to the other user terminals along with one of the indexes corresponding to the encrypting communication key;

receiving means for receiving transmitted encrypted communications from the other user terminals via the communication server; and decrypting means for decrypting the encrypted transmitted communications from other user terminals using a received unique index to identify an encrypting common key from said storing means.

23. The communication system of claim 22, wherein said commanding means designates each coordinated event in accordance with a predetermined passage of time.

24. A machine-readable storage storing at least one program controlling a user terminal, which is in communication with other user terminals over a communication network via a communication server, according to a process comprising:
   commanding identification of an identifier corresponding to an electronic conference room administered by the communication server through which the plurality of user terminals communicate with one another;
   generating a plurality of common keys based upon the identifier, each generated common key having a unique index identifying the common key;
   detecting predetermined changes In the electronic conference room;
   designating the detected changes as coordinated events;
   generating the plurality of new common keys based upon the coordinate events, each new common key having as the unique index a coordinate event that triggered generation of the new common key;
   storing the generated common keys such that each common key is identifiable by each unique index;
   encrypting communications to be sent from one user terminal to other user terminals via the communication server, the encrypting using a newest of the stored common keys;
   transmitting, via the communication server, the encrypted communications to the other user terminals along with one of the indexes corresponding to the encrypting communication key;
   receiving transmitted encrypted communications from the other user terminals via the communication server; and
   decrypting the encrypted transmitted communications from other user terminals by using a received unique index to identify a stored encrypting common key.

25. A machine-readable storage storing at least one program controlling a user terminal, which is in communication with other user terminals over a communication network via a communication server, according to a process comprising:
   commanding identification of an identifier corresponding to an electronic conference room administered by the communication server through which the plurality of user terminals communicate with one another;
   generating the plurality of common keys based on the identifier, each generated common key having a unique index identifying the common key;
   storing the generated common keys such that each common key is identifiable by the unique index;
   defining a limit on a maximum number of common keys storable;
   once the maximum number of the common keys has been stored, deleting an oldest of the common keys to make room for a new common key;
   encrypting communications to be sent from one user terminal to other user terminals via the communication server, the encrypting using a newest of the stored common keys;
   transmitting, via the communication server, the encrypted communications to the other user terminals along with one of the indexes corresponding to the encrypting communication key;
   receiving transmitted encrypted communications from the other user terminals via the communication server; and
   decrypting the encrypted transmitted communications from other user terminals using a received unique index to identify a stored encrypting common key.

26. A method of controlling a user terminal, which is in communication with other user terminals over a communication network via a communication server, comprising:
   storing at least one private key;
   detecting predetermined changes in the electronic conference room;
   designating the detected changes in the electronic conference room as coordinated events;
   specifying an identifier corresponding to an electronic conference room on the network, a coordinated event, and a private key;
   generating separately in each user terminal at least one common key based on the specified electronic conference room identifier, the coordinated event and the private key;
   storing the generated common keys such that each common key is identifiable by an index that corresponds to the coordinated event based upon which the common key is generated, one index per common key;
   processing a communication to be transmitted to the electronic conference room by encrypting content of the communication using a newest of the at least one stored generated common key;
   sending the encrypted communication along with one of the indexes corresponding to the newest common key used to encrypt the contents of the communication;
   receiving a communication message from the electronic conference room;
   extracting an index from the received communication message;
   identifying one of the stored generated common keys using the extracted index; and
   decrypting the encrypted contents of the received communication message using the identified common key.

27. A method of controlling a user terminal, which is in communication with other user terminals over a communication network via a communication server, comprising:
   commanding identification of an identifier corresponding to an electronic conference room administered by the communication server through which the plurality of user terminals communicate with one another;
   generating the plurality of common keys based on the identifier, each generated common key having a unique index identifying the common key;
   storing the generated common keys such that each common key is identifiable by the unique index;
   defining a limit on a maximum number of common keys storable;
   once the maximum number of the common keys has been stored, deleting an oldest of the common keys to make room for a new common key;
   encrypting communications to be sent from one user terminal to other user terminals via the communication server, the encrypting using a newest of the stored common keys;
   transmitting, via the communication server, the encrypted communications to the other user terminals along with one of the indexes corresponding to the encrypting communication key;

receiving transmitted encrypted communications from the other user terminals via the communication server; and decrypting the encrypted transmitted communications from other user terminals using a received unique index to identify a stored encrypting common key.

28. A data communication system, comprising:

a plurality of user terminals that communicate with one another over a network, each user terminal comprising;

a computer processor programmed to control the user terminal according to a process comprising:

commanding identification of an identifier corresponding to an electronic conference room via the network through which the plurality of user terminals communicate with one another, generating a plurality of common keys based upon the identifier, each generated common key having a unique index identifying the common key, detecting predetermined changes in the electronic conference room, designating the detected changes as coordinated events, generating the plurality of common keys based upon the coordinate events, each common key having a coordinate event that triggered generation of the common key as the unique index, storing the generated common keys such that each common key is identifiable by each unique index, encrypting communications to be sent from one user terminal to other user terminals via the network, the encrypting using a newest of the stored common keys, transmitting, via the network, the encrypted communications to the other user terminals along with one of the indexes corresponding to the encrypting communication key, receiving transmitted encrypted communications from the other user terminals via network, and decrypting the encrypted transmitted communications from other user terminals by using a received unique index to identify a stored encrypting common key.

* * * * *

UNITED STATES PATENT AND TRADEMARK OFFICE
CERTIFICATE OF CORRECTION

PATENT NO. : 6,742,116 B1
DATED : May 25, 2004
INVENTOR(S) : Kazuki Matsui et al.

It is certified that error appears in the above-identified patent and that said Letters Patent is hereby corrected as shown below:

Title page,
Item [56], References Cited, U.S. PATENT DOCUMENTS, please add:

| | | | |
|---|---|---|---|
| -- 4,649,233 | 03/1987 | Bass et al. | 713/171 |
| 5,369,705 | 11/1994 | Bird et al. | 713/163 |
| 5,193,114 | 03/1993 | Moseley | 713/183 |
| 5,497,423 | 03/1996 | Miyaji | 380/30 |
| 5,633,928 | 05/1997 | Lenstra et al. | 380/286 |
| 6,041,408 | 03/2000 | Nishioka et al. | 713/171 |
| 4,779,224 | 10/1988 | Moseley et al. | 713/202 --. |

Column 19,
Line 5, delete ",".;
Line 60, after "event" insert -- , --.

Column 21,
Line 17, change "In" to -- in --.

Signed and Sealed this

Twenty-eighth Day of September, 2004

JON W. DUDAS
*Director of the United States Patent and Trademark Office*